United States Patent [19]
DuBell

[11] Patent Number: 5,749,219
[45] Date of Patent: May 12, 1998

[54] COMBUSTOR WITH FIRST AND SECOND ZONES

[75] Inventor: Thomas L. DuBell, Palm Beach Gardens, Fla.

[73] Assignee: United Technologies Corporation, Hartford, Conn.

[21] Appl. No.: 443,549

[22] Filed: Nov. 30, 1989

[51] Int. Cl.⁶ .................................. F02C 3/08; F02C 1/00
[52] U.S. Cl. .................. 60/39.36; 60/733; 60/737; 60/746
[58] Field of Search ..................... 60/39.36, 733, 60/737, 746

[56] References Cited

U.S. PATENT DOCUMENTS

| | | | |
|---|---|---|---|
| 3,934,409 | 1/1976 | Quillévéré et al. | 60/733 |
| 4,112,676 | 9/1978 | DeCorso | 60/733 |
| 4,420,929 | 12/1983 | Jorgensen et al. | 60/733 |
| 4,683,715 | 8/1987 | Iizuka et al. | 60/733 |
| 4,785,623 | 11/1988 | Reynolds | 60/39.36 |

FOREIGN PATENT DOCUMENTS

| | | | |
|---|---|---|---|
| 222173 | 5/1987 | European Pat. Off. | 60/733 |
| 2455909 | 6/1975 | Germany | 60/733 |
| 240833 | 11/1985 | Japan | 60/733 |

OTHER PUBLICATIONS

Lefebvre, Arthur H. *Gas Turbine Combustion*, McGraw Hill, 1983. pp. 477–490.

*Primary Examiner*—Peter A. Nelson
*Attorney, Agent, or Firm*—Norman Friedland

[57] ABSTRACT

A high performance annular combustor for a gas turbine engine powering aircraft consisting of a primary combustion zone with the fuel nozzles and air swirlers in the dome and having typical combustion/dilution air holes in the liner and a secondary zone downstream of the primary zone having fuel nozzles and air swirlers operational solely when the primary zone is at a predetermined stoichiometric condition and issuing fuel which is at parity with the fuel/air ratio of the primary zone.

3 Claims, 1 Drawing Sheet

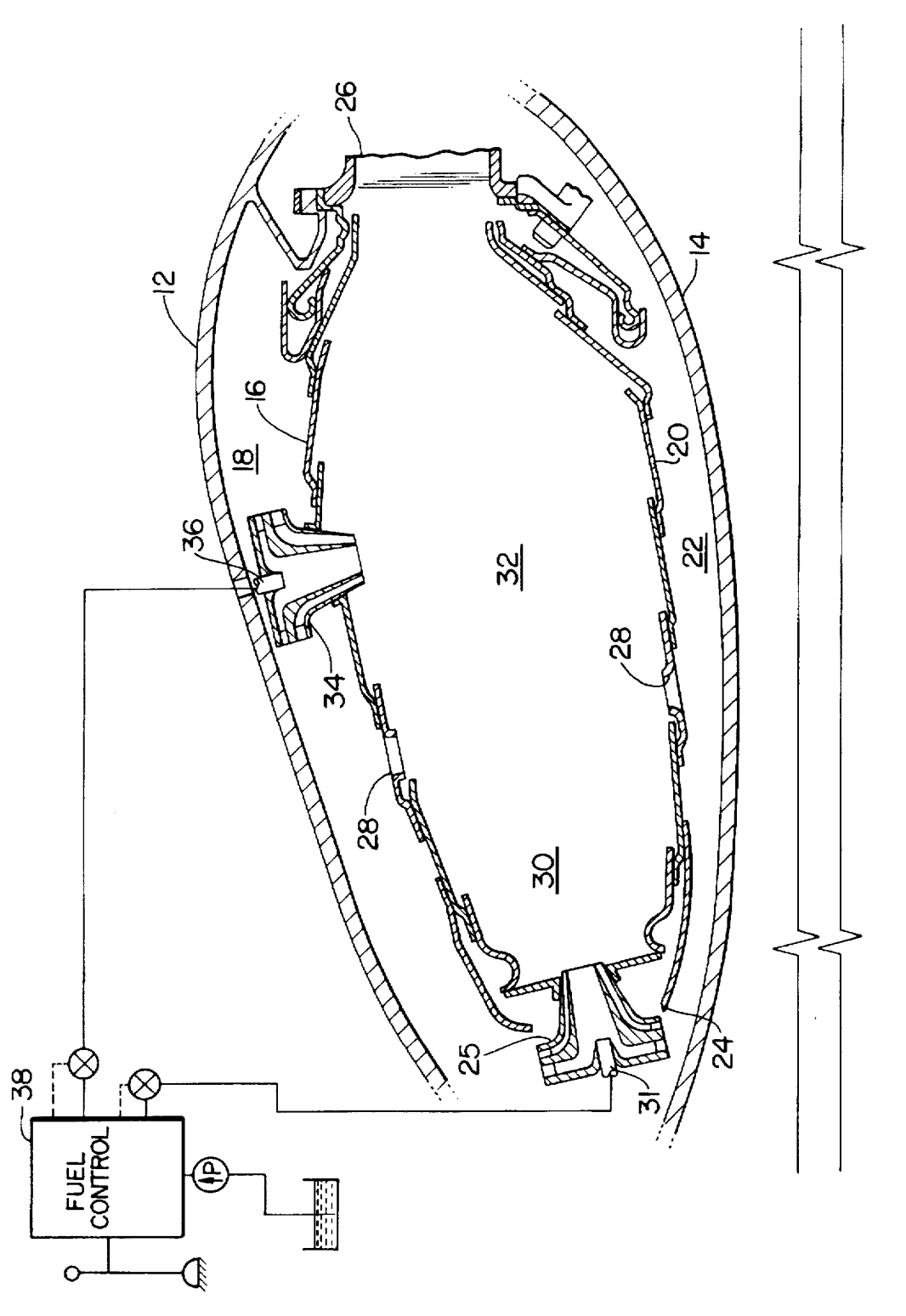

COMBUSTOR WITH FIRST AND SECOND ZONES

TECHNICAL FIELD

This invention relates to gas turbine power plants and more particularly to its combustor.

BACKGROUND ART

The advent of high speed, high performance gas turbine engines for powering military aircraft imposes exacting requirements on the engine's combustors that are challenging to the combustor designer. Current day gas turbine engine combustors exhibit combustion efficiencies in the high 90 percentile and operate near 50% stoichiometric conditions, combustors to meet the needs of tomorrow's military engines must exhibit an extremely high performance exceeding the limits of today's state-of-the-art combustors.

In other words, the combustor, in addition to producing low pollutants, (1) require very high, uniform temperature rise, (2) must minimize smoke emissions, and (3) must be able to initiate and/or maintain combustion at very low fuel/air ratios and under adverse environmental conditions such as high altitude windmill starting. This is referred to as good operability. Additionally, the high temperature gases generated by the combustor for driving the turbine must exhibit very low temperature distribution (pattern factor). To achieve this end the fuel and air must be perfectly mixed and complete combustion in a short distance must ensue.

As one skilled in this art will attest to, all of these goals are, indeed, difficult to achieve simply because each individual requirement conflicts with the design criteria of each of the other requirements.

Thus, execution of an acceptable combustor must satisfy each of the following conflicting approaches:

(1) low pattern factor which requires nearly perfect mixing, (2) low smoke which requires uniform and low fuel/air ratio in the front end of the combustor, and (3) good operability which requires nonuniform and/or high fuel/air ratio in the front end of the combustor.

None of the current state-of-the-art combustors are capable of satisfying all of these demands nor are there approaches in this technology known to the skilled artisan that can satisfy all of these challenges. For example, variable geometry of the combustor to vary fuel and/or air and/or air zoning (staging) can be used to provide high temperature rise, low smoke and good operability, but these designs adversely impact the low pattern factor. Premixing/prevaporizing of fuel/air and injection into the combustor in a uniform (circumferential or annular) manner has the propensity of attaining a very low pattern factor, but these designs would adversely impact the good operability and durability of the combustor.

Combustors that utilize different zones that are fueled by different sets of nozzles are disclosed for example in U.S. Pat. No. 3,934,409 granted to H. A. Ouillevere and J. E. J. Caruel on Jan. 27, 1976 entitled "Gas Turbine Combustion Chambers", and U.S. Pat. No. 4,420,929 granted to R. A. Jorgensen, R. A. Farrell and B. W. Gerhold on Dec. 20, 1983 entitled "Dual Stage-Dual Mode Low Emission Gas Turbine Combustion System". These are systems that, for example, require mixing of the fuel/air combusted products of both zones or add additional air in the second zone downstream of the second set of nozzles.

I have found that I can obviate the problems alluded to in the above and attain a combustor that will provide:

(1) good operability, (2) low smoke, and (3) high, uniform temperature rise.

To this end, the combustor employing this invention is divided into two zones. The first zone is similar to a conventional annular combustor, and the second zone is designed to attain high power operation while satisfying the criteria suggested hereinabove.

To this end, the first zone fuel nozzles serve to limit the maximum and minimum fuel/air ratio in the primary zone and is the only operable zone until the stoichiometric value of the combusted gases are at, or nearly at, 100%. This controls smoke emission, provides good operability and assures good mixing of the fuel and air to produce low temperature distortion in the primary zone. The amount of fuel flow that can be injected through the nozzle/swirler at high power is limited to that which produces the desired combustor exit temperature at the exit of the primary zone. In accordance with this invention, the rest of the air required for combustion (all except cooling air flow) is admitted through the secondary jets. These jets may be installed only in the outer liner or in both liners. Additional fuel nozzles are integrated with these jets (which may include swirlers) and fuel this airflow to produce the same high power operating fuel/air ratio as the gases exiting the primary zone. This secondary fuel/air mixture burns in the secondary zone to the same average gas temperature as those gases leaving the primary zone. The combustion products from the primary zone initiate combustion in the secondary zone. Since these secondary jets are fueled to the same fuel/air ratio as the primary zone gases, perfect mixing of these two streams is not needed to achieve low pattern factor.

This invention also contemplates that the fuel split between the primary fuel nozzles and the secondary fuel nozzles can be changed at low power operation during deceleration and during starting to achieve exceptional operability characteristics. For example, only the primary fuel nozzles would be fueled during starting and at low fuel/air operation, such as at idle power. It is possible that the best balance of all performance parameters is achieved with unequal fuel/air ratios at first stage and second stage during high power operation.

DISCLOSURE OF THE INVENTION

An object of this invention is to provide an improved combustor for a gas turbine engine for powering aircraft.

A feature of this invention is to provide an annular combustor that includes conventional design techniques for executing the primary combustion zone and providing a secondary zone that solely admits fuel/air for combustion in an axially spaced station downstream of the primary combustion zone where the fuel/air nozzles are either in the outer liner or in both the outer and inner liner and where the fuel is admitted into the second zone solely at a predetermined operating condition and where the combustion process exhibits a temperature value substantially equal to the temperature value of the combustion products exiting the primary zone.

A still further feature of this invention is the capability of executing the design with current state-of-the-art components.

The foregoing and other features and advantages of the present invention will become more apparent from the following description and accompanying drawing.

BRIEF DESCRIPTION OF THE DRAWING

The sole FIGURE is a schematic illustration of this invention.

BEST MODE FOR CARRYING OUT THE INVENTION

While this invention is described in its preferred embodiment schematically showing the component parts of the combustor, it is to be understood that the invention contemplates utilizing state-of-the art components. That is to say the liner, fuel nozzles, swirlers, controls and the like are currently in use as, for example, in the family of F100 engines manufactured by Pratt & Whitney of United Technologies Corporation, the assignee common to the assignee of this patent application, supra, which are incorporated herein by reference. It is to be understood that although the combustor configuration is different than heretofore designs, the state-of-the-art technology can be applied to this design.

This will become more apparent in conjunction with the description of the sole FIGURE which schematically illustrates an annular combustor generally referenced by reference numeral 10 supported to, but spaced from, engine case 12 and inner combustor case 14. Hence, the outer liner 16 together with the engine case 12 define annular passage 18 and the inner combustor case 14 and inner liner 20 define the annular passage 22. The dome 24 connected to the fore ends of liners 16 and 20 encloses the front end of the combustor while the aft end 26 is open to feed the accelerated combusted products to the turbine (not shown).

As is typical in combustor design, compressed air from the compressor (not shown) feeds the combustor with air for combustion, dilution and cooling after first being diffused.

In this embodiment, a typical primary zone 30 is defined by the fore end of liners 16 and 20 and dome 24, which is fueled by suitable swirl vanes 25 of fuel nozzles 31 that inject a predetermined amount of fuel and to combined with the fixed amount of air to establish the required fuel/air mixture for attaining the power level required particularly during less than full power engine operation.

As can be seen in the sole FIGURE, typical combustion holes 28 located in the inner and outer liners 16 and 20 are utilized to assure proper fuel/air mixture and combustion. Hence, the primary zone would be designed utilizing state-of-the-art technology to assure that proper fuel/air ratio is obtained for achieving optimum stoichiometric burning.

However, at higher power levels and once stoichiometric burning is achieved in the primary zone 30, the fuel nozzles 36 in the second zone becomes operational. Obviously, the air swirlers 34 continuously inject air into the second zone 52 during the entire engine operating envelope and are only fueled at this predetermined operation condition. Fuel nozzles 36 are actuated when the pilot calls for high power actuation via the fuel control 38.

The fuel nozzles 36 which can be identical to fuel nozzles 31 and when actuated deliver a predetermined amount of fuel so as to attain a given fuel/air ratio in the second zone 32. This fuel/air ratio matches the fuel/air ratio of the primary nozzles so that the temperature in the secondary zone equals or nearly equals the temperature of gases entering the primary zone. This assures an even temperature distribution through each axial expanse of the combustor and hence, a low pattern factor at the discharge end 26 of the combustor without the necessity of mixing mechanisms that are typically employed in heretofore designs. To assure the proper operation of the second zone, the liner downstream of the second zone is void of combustion holes and dilution holes. The only external air admitted at this location is the air admitted through swirlers 34 save for the small portion of air used in cooling the liner. In the best mode, the air admitted into the combustor is proportioned as follows: 15% thru swirler 25, 11% combustion holes 28 in outer liners 16, 11% thru combustion holes 28 in inner liner 20, 38% thru air swirlers 34, and 15% fan cooling the liner defining the primary zone and 10% for cooling the liner defining the secondary zone.

While in the preferred embodiment it is contemplated that the fuel/air ratio in the secondary zone matches the fuel/air ratio in the primary zone, in certain application better performance may be achieved by slight tailoring of the ratio between the primary and secondary zones during the high power operation.

By virtue of this invention it is possible to attain in a suitably sized combustor the high average exit temperature necessary for high performance combustor for improved gas turbine engines while still attaining low exhaust smoke, low pattern factor and good operability.

Additionally, the invention can be implemented with state-of-the-art hardware without resorting to the complicated and costly variable geometry and other exotic technology.

Although this invention has been shown and described with respect to detailed embodiments thereof, it will be understood by those skilled in the art that various changes in form and detail thereof may be made without departing from the spirit and scope of the claimed invention.

I claim:

1. An annular combustor having a first axially extending, annular shaped liner, a second axially extending, annular shaped liner concentrically mounted to and spaced from said first liner, said first liner and said second liner defining an annular chamber where combustion ensues, a dome interconnecting said first liner and said second liner at the forward end for enclosing said forward end, the aft end of said annular chamber being opened for flowing the products of combustion, spaced inner casing and outer casing surrounding said first liner and said second liner and defining a pair of cavities for receiving cooling air, said annular chamber having a first combustion zone at the forward end of said annular chamber, at least a first fuel nozzle mounted in said dome for issuing fuel into said first combustion zone, at least a first air swirler in said dome for issuing air into said first combustion zone, an opening in said liner for radially flowing cooling air into said first combustion zone, a second combustion zone immediately downstream relative to the flow of combustion products of said first combustion zone and axially spaced from said opening, a second fuel nozzle in said first liner for issuing fuel directly into said second combustion zone at a predetermined combustor operation after said first combustion zone is in operation, a second air swirler in said first liner for radially issuing the only air for fuel/air mixing into said second combustion zone, and means responding to said predetermined combustor operation for controlling the flow of fuel into said second fuel nozzle to match the fuel/air ratio of the combustion products leaving the first combustion zone.

2. An annular combustor as claimed in claim 1 wherein said second fuel nozzle is mounted in said first or which is in proximity to the outer casing.

3. An annular combustor as claimed in claim 2 wherein said second air swirler is mounted in the same liner as said second nozzle.

* * * * *